United States Patent [19]
Collins

[11] 3,926,131
[45] Dec. 16, 1975

[54] INJECTOR FOR SOIL TREATING LIQUIDS
[76] Inventor: William C. Collins, 5501 SW. 74 St., Miami, Fla. 33143
[22] Filed: Mar. 29, 1973
[21] Appl. No.: 346,023

[52] U.S. Cl. .................................... 111/6; 172/21
[51] Int. Cl.² ........................................ A01C 23/02
[58] Field of Search ..................... 111/7, 6, 7.1–7.4, 111/89, 90; 172/21

[56] References Cited
UNITED STATES PATENTS

| | | | |
|---|---|---|---|
| 1,871,529 | 8/1932 | Karshner | 111/6 |
| 2,789,522 | 4/1957 | Barton | 111/6 |
| 3,025,806 | 3/1962 | Peck | 111/6 |
| 3,136,274 | 6/1964 | Townsend | 111/6 |
| 3,602,166 | 8/1971 | Peterson | 111/6 |
| 3,783,804 | 1/1974 | Platz | 111/7.4 |

FOREIGN PATENTS OR APPLICATIONS
309,846  2/1974  Switzerland ........................... 111/6

Primary Examiner—Stephen C. Pellegrino
Attorney, Agent, or Firm—Cushman, Darby & Cushman

[57] ABSTRACT

A machine propelled vertical injector for soil treating liquids for modifying soil fertility and for applying nematacides, insecticides, herbicides, fungicides and other chemical soil conditioners under pressure and loosening soil compaction. The valving means of the injector may be operated by a ground-engaging foot. The applicator unit is connected by a high pressure hose line to a treating liquid supply.

3 Claims, 4 Drawing Figures

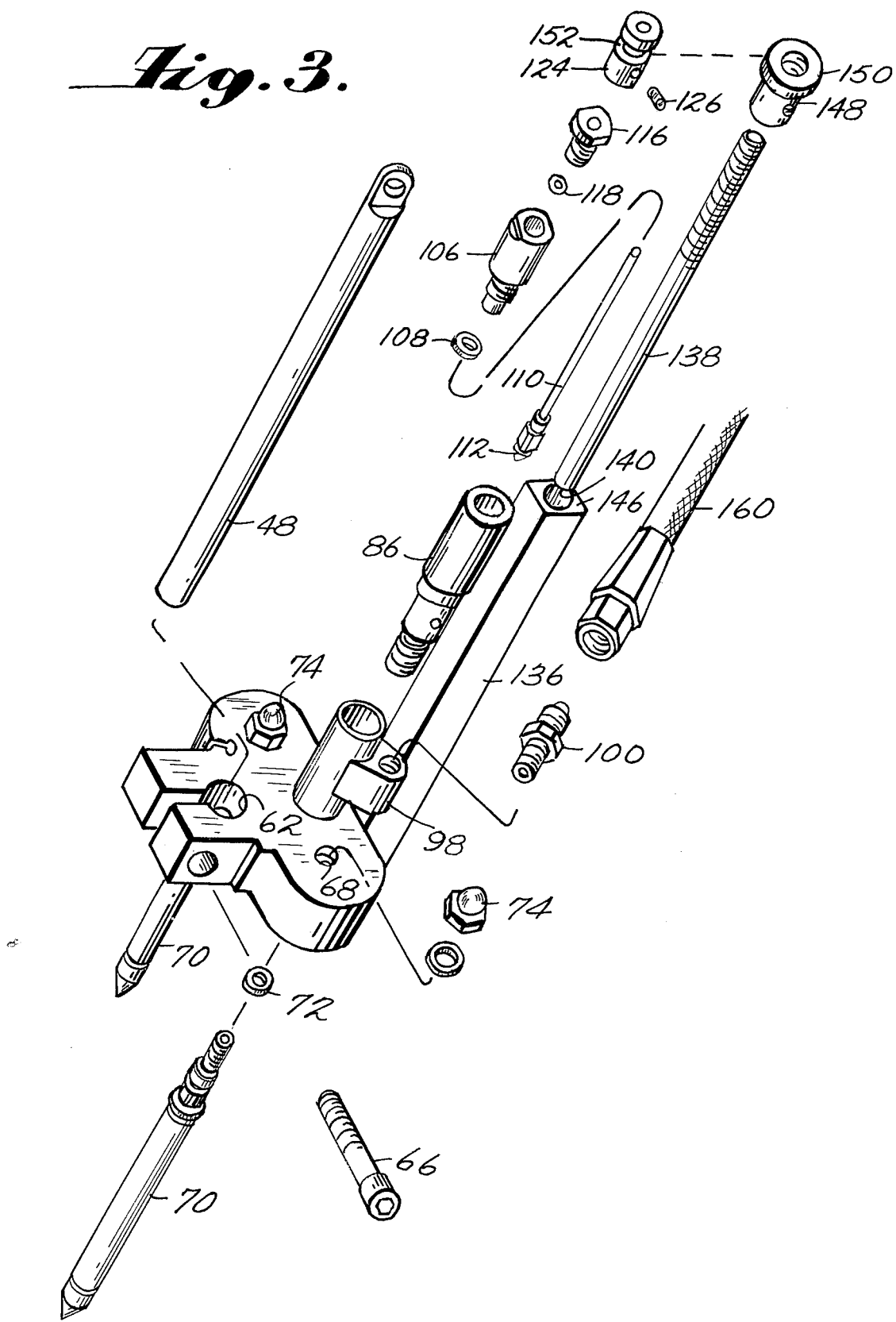

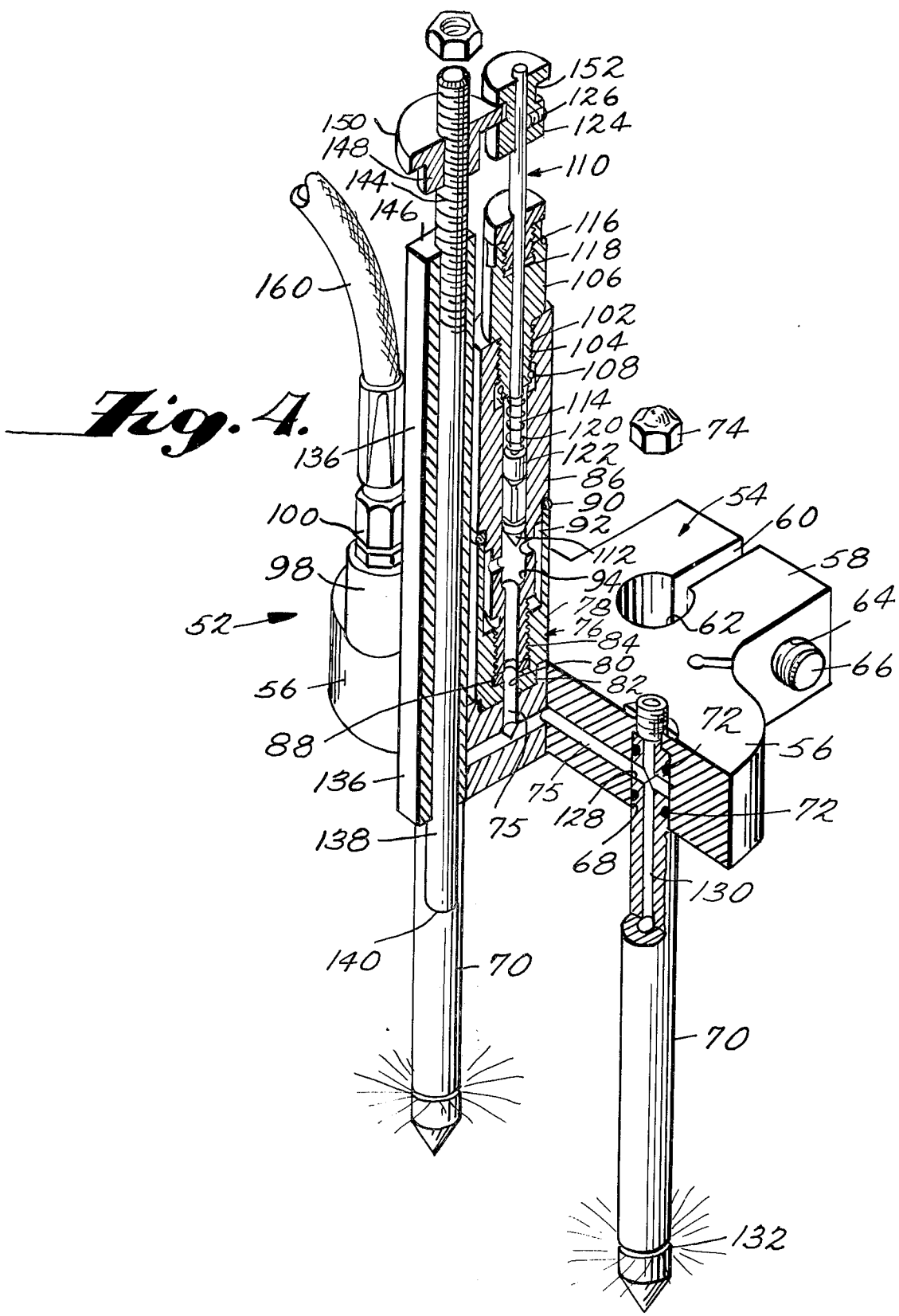

INJECTOR FOR SOIL TREATING LIQUIDS

BACKGROUND OF THE INVENTION

Self-contained, hand-operated single point soil injectors have previously been available from Innis Speiden Chemical Company formerly of 117 Liberty Street, New York City, N.Y. and might presently be available from the Panagen Company, division of Morton Salt Company. Another example of such prior equipment is the Mack Anti-weed gun. Turf aerators are known in the prior art, an example being the Greensaire turf aerator available from the Ryan Equipment Company subsidiary of Outboard Marine Corporation. The device of the invention, in embodiments initially constructed, has been built as a modification of the Ryan WG24-1 Turf Airifyer.

U.S. Pat. No. 3,602,166 to Peterson of Aug. 31, 1971, particularly in FIG. 12, illustrates a valve means for supplying fluid to a liquid injector comprising a vertically actuated rod and a perforated valve tip. The valving arrangement in this instance is operated by means of the turning drum having the injector needle on it as opposed to a separate ground engaging foot as in the present invention.

U.S. Pat. No. 3,136,274, Townsend, June 9, 1964 illustrates a somewhat different valving mechanism in FIG. 6, again operating off of the injector needle moving mechanism of the machine as opposed to a ground engaging foot. The drives as shown in this and the previous patent are perhaps of only general interest, as are drive mechanisms of U.S. Pat. Nos. 2,056,337, Archibald of Oct. 6, 1936 and 2,255,040, Helbig of Sept. 9, 1941, these latter two patents being directed to lawn spikers having no injection means.

U.S. Pat. No. 3,025,806, Peck, Mar. 20, 1962 is directed to an injection nozzle arrangement having a valve which is operated by a ground engagement member. The entire unit is rotated as opposed to being vertically reciprocated.

The following patents show generally vertically reciprocated tubular tine means for injecting liquid plant or soil treating agents into the ground:

| Patent No. | Patentee | Issue Date |
| --- | --- | --- |
| 1,871,529 | G. C. Karshner | August 16, 1932 |
| 2,214,083 | M. Lester | September 10, 1940 |
| 2,789,522 | J. R. Barton | April 23, 1957 |
| 3,136,274 | W. M. Townsend | June 9, 1964 |
| 3,148,643 | H. L. Mussett et al. | September 15, 1964 |
| 3,450,073 | R. E. Baker | June 17, 1969 |

SUMMARY OF THE INVENTION

The invention provides a device for loosening soil compaction, correcting soil pH, changing soil fertility, correcting adverse soil pest conditions (nematodes, diseases, weeds, insects) by supplying the plant roots with systemic insecticides, fungicides, nematacides or herbacides.

The device includes a wheeled, preferably self-propelled chassis, equipped with means for generally vertically reciprocating a plurality of shafts, preferably in staggered order. Each shaft has at least one downwardly projecting tine secured thereon which includes a outlet means near the lower tip thereof and interior passageway means communicating through a valve to a manifold for all the tines. The manifold is connected via a high pressure hose line to a separate, high pressure reservoir of liquid to be sprayed. Accordingly, liquid treatment material can be injected under high pressure, high volume conditions by an easily manouverable applicator, since the operator need not lug around the reservoir.

Seen as an adaptation of the Ryan WG24-1 Turf Airifyer, the adaptation involves removing the coring tines and related casting from the lower ends of the six vertically reciprocated shafts of the device and mounting the six dual tong injector units of the present modification. These are connected by individual high pressure lines to a manifold also mounted on the device as part of the adaptation thereof. The manifold is connected via a single high pressure hose e.g. to a tank trailer-type pressured liquid reservoir. Then the adapted unit is drawn along the ground or turf to be treated. Instead of pulling a plug of dirt and grass from the ground as the unmodified machine would have, the adapted machine injects a calibrated amount of liquid treating mixture into and below the surface of the ground with little damage to the surface. Typical pressurization for the injected liquid is 150–600 p.s.i., injections typically being on two inch centers to an adjustable depth exemplified by up to 4 inches, delivering an adjustible amount of from 1–50 gallons of treating liquid per 1000 square feet of turf area.

In reality, the machine of the invention may be built from scratch, but there are so many Ryan Turf Airifyers in use that building from scratch is impractical and modification of existing equipment as described is much more expedient.

The device of the invention is preferred for use in administering toxic treating liquids since, by depositing them beneath the surface, the danger of lateral runoff to streams is minimized.

The principles of the invention will be further hereinafter discussed with reference to the drawings wherein a preferred embodiment is shown. The specifics illustrated in the drawings are intended to exemplify, rather than limit, aspects of the invention as defined in the claims.

BRIEF DESCRIPTION OF THE DRAWINGS

FIG. 3 is an exploded perspective of one dual tong injector; and

FIG. 4 is a partly cut-away perspective view of one dual tong injector, shown with the valve thereof reciprocated to a valve-open condition.

DETAILED DESCRIPTION OF THE PRESENTLY PREFERRED EMBODIMENT

Figure 1:
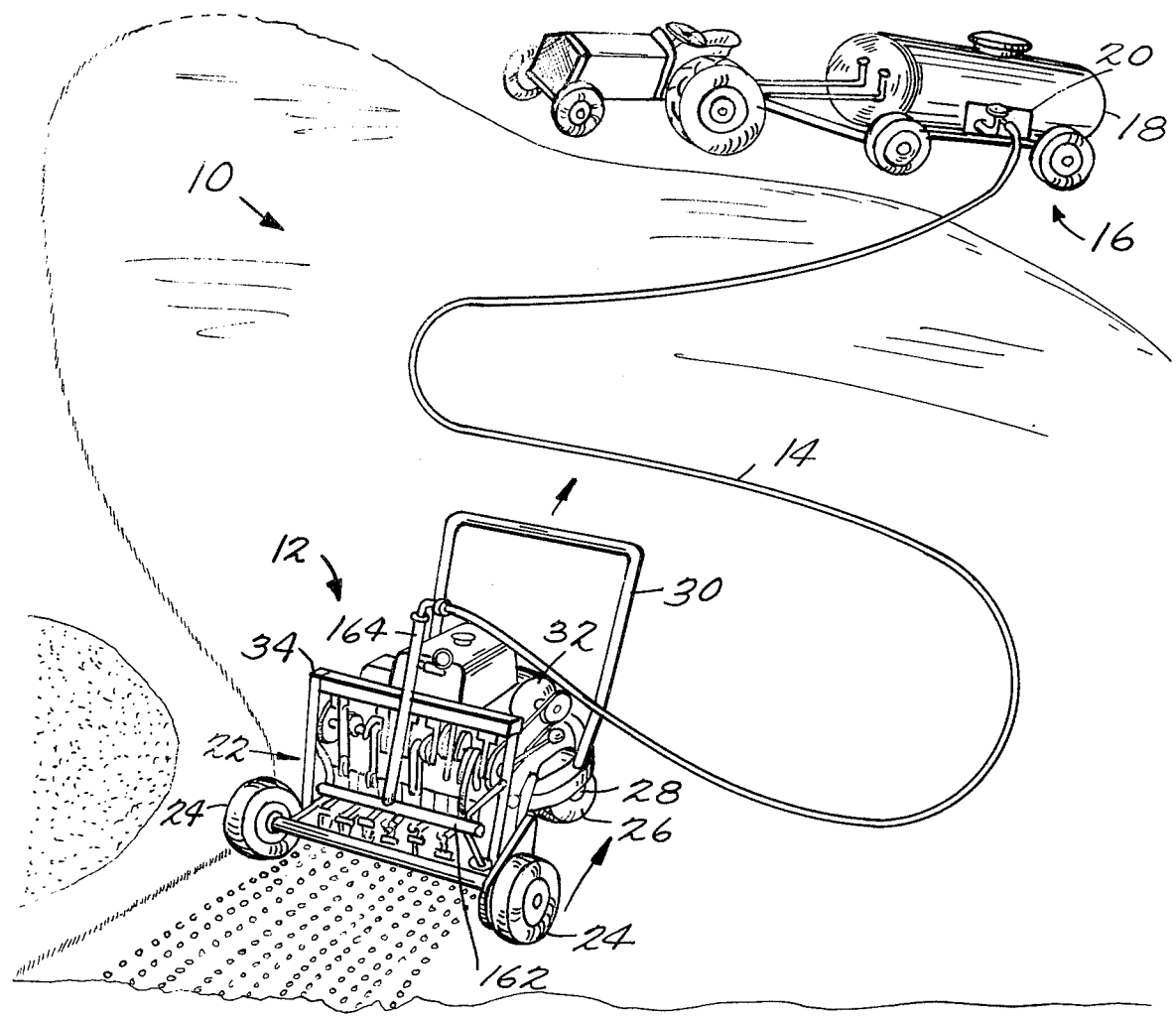
FIG. 1 is a perspective view of the device in use.
Figure 2:
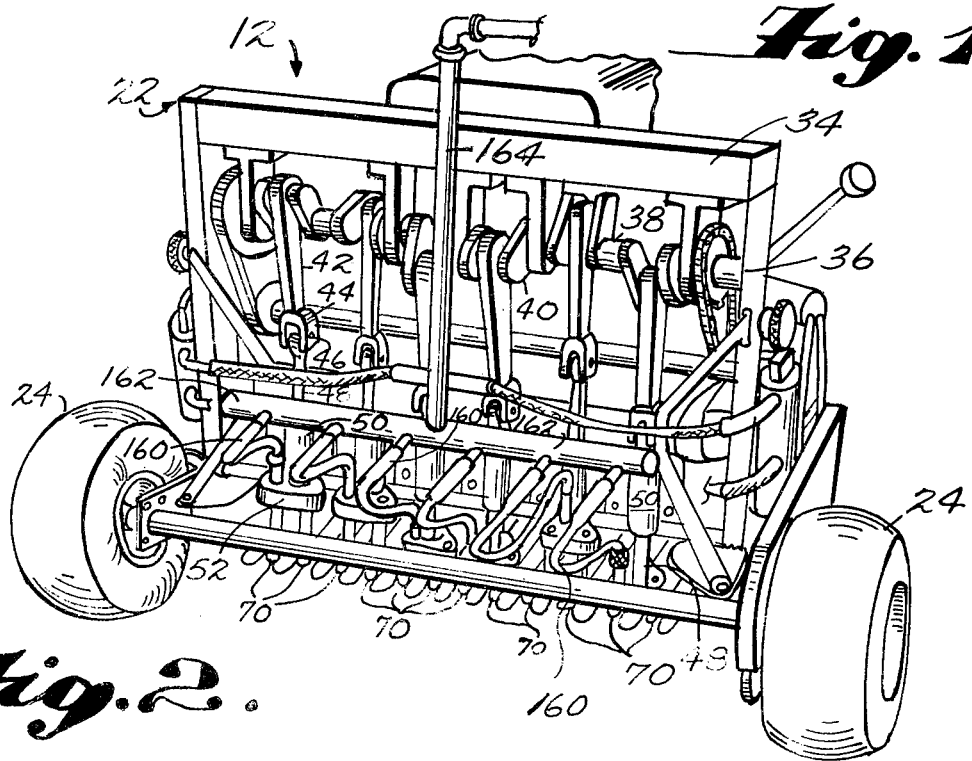
FIG. 2 is a perspective view of the injector unit of the device seen more from the rear and on a larger scale.

The pressurized liquid injector 10 of the invention includes an applicator unit 12 connected by a high pressure hose line 14 to a pressurized treating liquid supply 16.

In the instance depicted, the supply 16 takes the form of a tank wagon or the like 18 having a compressor 20 for placing the treating liquid under e.g. 150–600 p.s.i. The supply 16 may be e.g. from an argicultural orchard spraying unit, with the hose line 14 connecting to the applicator unit 12 rather than to a tree spraying wand.

The applicator unit 12 includes a frame 22 having right and left rear wheels 24 and a steering system comprising a two wheeled bogey or truck 26 journalled with respect to the frame 22 at 28 and having a forwardly projecting steering bar or tiller 30. A gasoline engine 32 is shown mounted on the frame and equipped for driving the wheels 24.

The frame further includes an inverted yoke 34 which at 36 mounts a crank shaft 38 having e.g. six angularly disparate, axially spaced offset cranking portions 40.

(Conventional drive interruption, clutch means are provided for disengaging the engine 32 from either the wheels 24 or the crank shaft 38).

Each cranking portion 40 has a crank arm 42 journalled thereon which terminates in a clevis 44 which is in turn pivotally pinned at 46 to the upper end of a push rod 48 slidably mounted in a sleeve bearing 50 fixed on the frame 22.

Each push rod 48 has a dual tong injector unit 52 mounted thereon below the respective sleeve bearing 50.

In the instance depicted (see especially FIGS. 3 and 4) each dual tong injector unit 52 includes a body 54 which may be cast, although an example fabricated by welding from plate and tube is illustrated. The body 54 comprises a base plate 56 having a lateral projection 58 split at 60 leading to a vertical opening 62. A threaded lateral opening 64 crosses the split 60 and receives a cap screw 66 for norrowing the split 60 to construct the opening 62 for securing the body 54 on the respective push rod 48. Two laterally spaced vertical openings 68 receive the upper ends of two respective tubular injector tongs 70. The latter are sealed with respect to the respective openings 68 by sealing ring means 72 and secured in place by nuts 74.

Within the body 54, passageways 75 communicate the two tongs near their upper ends 10 with a valve housing 76 incorporated into the body 54.

As depicted, the valve housing 76 is an upright, composite tubular member 78 having its throughbore 80 in communication with the passageway 75 at the lower end of the throughbore 80.

The lower most portion 82 of the housing 76 is internally threaded at 84 to receive the exteriorly threaded lower end of an intermediate tubular portion 86. An internal seal is made between these two parts at 88 and an external seal is made between them at 90. Intermediate these seals 88, 90, the parts 82 and 86 are radially spaced from one another circumferentially to define an annular chamber 92 the throughbore 80 flares upwardly to provide a frustoconcial valve seat 94. Above the valve seat 94 radial bores 96 interconnect the throughbore 80 with the chamber 92. A conduit 98 connects the chamber 92 with a hose fitting 100. The valve housing intermediate portion upwardly terminates in an internally threaded portion 102 which receives the externally threaded lower end 104 of an upper portion 106. A seal is formed between these parts at 108.

A valve body 110 is reciprocatingly received in the throughbore 80 above the valve seat 94. It includes a conical tip 112 preferably made of resilient material such as nylon for sealing against the valve seat 94 when the valve is closed. The body 110 has a metal rod 114 as a stem. This rod 114 projects up the throughbore 80 and out the upper end thereof through an annular gland nut 116 which seals with the rod at 118.

A compression coil spring 120 encircling the rod 114 within the bore 80 gains purchase between the enlarged head 122 of the valve body and the lower end of the valve housing upper portion 106 to normally bias the valve toward a closed condition.

Outside the housing, a valve stem pusher 124 is mounted on the stem 114 with securement means 126. Accordingly, upward force on the pusher 124 raises the valve body away from the valve seat against the restoration force of the spring 120 permitting liquid supplied under pressure via the hose fitting 100 to flow through the conduit 98, into the chamber 92, through the radial bores 96, into the throughbore 80, down between the valve body tip 112 and seat 94, into the passageways 75, into the two tongs through radial passageways 128, down the throughbores 130 of the two respective tongs and out the radiating openings 132 provided just above the solid, pointed lower tips 134 of the two respective tongs.

Each dual tong injector unit body 54 further includes a tubular, generally vertical, valve actuator mounting sleeve 136 disposed adjacent the valve housing. The sleeve 136 acts as a sleeve bearing for an actuator rod 138 which has a lower end 140 protruding below the lower end 142 of the sleeve 136 for engagement with the surface of the ground. The region 144 near the upper end of the rod 138 is externally threaded and protrudes above the upper end 146 of the sleeve 136 and threadably mounts an internally threaded flange member 148. The latter has a flange portion 150 which protrudes laterally into the external lateral groove 152 of the valve stem pusher 124, connecting the valve stem to the actuator so that when the actuator is pushed up by contact of the lower end 142 with the ground, the valve is opened until further rotation of the crank shaft 38 raises the dual tong injector unit under consideration sufficiently to permit the actuator rod 138 to begin to lower. It should be apparent that rotative adjustment of the flange member 148 relative to the rod 138, by threading, vertically adjusts the deposition of the lower end 142 of the rod 138 with respect to the rest of the particular dual tong injector unit and the surface of the ground, thus providing a means for increasing and decreasing the proportion of the vertical indexing cycle for the respective dual tong injector unit during which the associated valve is open and the two associated tongs injecting. The earlier and later a valve is open the more liquid will be injected and the thicker the band of injection will be reaching the same depth but extending up closer to the surface of the ground, other factors being equal.

When being used, for instance to treat the turf of a golf course green, the tank wagon 18 is drawn to its border and its contained treating liquid delivered under high pressure by the pump 20 through the hose line 14 to the application unit 12. That unit is led over the surface of green, much like a power mower. As the dual tong units 52 are indexed up and down by the crank shaft 38, the respective actuator rods 138 strike the ground during the downstrokes opening the respective valves 110 while the respective injector tips are below the upper surface of the turf.

Each hose fitting 100 connects a flexible hose 160 with a manifold 162 mounted on the frame 22. The manifold 162 has an inlet pipe 164 which connects at its upper end with the high pressure hose 14 to receive a supply of treating liquid from the compressor 20 on the tank wagon 18.

There are instances where it is disadvantageous to operate the valves 110 from push rod engagement with the ground at 140. In such instances, suitable comming means may be provided which work from the cam shaft 38 to cause the actuators 124 to relatively lift with respect to the valve housing 76 when the respective bodies 56 are moved downward because of their securement on the respective vertically reciprocated rods 48.

Being able to treat with injections at relatively high pressure, while separating the bulk supply and presurization bulk and weight to a relatively stationary place (the tank wagon) so that it does not have to be lugged around with the applicator unit makes the latter much more mobile and versatile.

It should now be apparent that the pressurized liquid injector for soil treatment as described hereinabove possesses each of the attributes set forth in the specification under the heading "Summary of the Invention" hereinbefore. Because the pressurized liquid injector for soil treatment can be modified to some extent without departing from the principles of the invention as they have been outlined and explained in this specification, the present invention should be understood as encompassing all such modifications as are within the spirit and scope of the following claims.

What is claimed is:

1. An injector for soil treating liquids, comprising:
    an applicator including a frame means for supporting the frame from the ground surface for permitting the frame to be drawn along the ground surface;
    a plurality of injection tongs generally arranged in a transversally extending row, each injection tong being vertically disposed and having a downwardly directed tip;
    indexing means mounting the injection tongs on the chassis for cyclic reciprocation of each tong between an upper extreme wherein the tip is raised clear of the ground surface and a lower extreme wherein the tip has plunged beneath the surface, the indexing means including: a crank shaft means, means for rotating the crank shaft; means pivotally connecting the tongs to the crank shaft means at a plurality of angularly disparate cranking positions for reciprocation upon rotation of the crank shaft;
    said tongs being grouped into a plurality of units, each unit including at least two of the tongs, the indexing means further including a body for each unit co-mounting the tongs thereof;
    means defining a nozzle adjacent each tip, aimed for dispensing treating liquid into the soil when the tip lies beneath the surface;
    means defining a passageway for liquid leading from the frame, through each tong to the nozzle means, said passageway including a manifold mounted on the frame, a high pressure hose connection upstream of the inlet to the manifold and a plurality of conduits leading from the manifold to the tongs;
    said plurality of conduits proceeding through the respective number of branches of said conduits to individually serve each tong;
    a valve for each unit, interposed in said passageway for normally selectively obstructing each conduit, each valve being disposed in the respective unit body upstream from the dividing of the respective conduit therein;
    a valve actuator having a first portion disposed to sense where the tong is in relation to its cycle of rising and plunging and a second portion connecting between the first portion and the respective valve for opening and closing the respective valve only during at least one portion of the cycle wherein the respective tong tip lies submerged below the surface;
    the first portion of the valve actuator for each valve comprising a rod mounted on the respective unit body for intermittent engagement with the ground and means connecting the rod to the second portion of the respective valve actuator;
    a reservoir disposed free of the applicator;
    high pressure flexible hose means communicating the reservoir with said passageway carried on the frame;
    pump means communicated with the reservoir and high pressure hose means for supplying treating liquid under pressure pressure in the range of 150–600 p.s.i. to the applicator.

2. The injector of claim 1, the connecting means being adjustable for adjusting the proportion of each cycle of rising and plunging wherein the respective rod is in engagement with the ground.

3. An injector for soil treating liquids, comprising:
    an applicator including a frame, means for supporting the frame from the ground surface for permitting the frame to be drawn along the ground surface;
    a plurality of injection tongs generally arranged in a transversally extending row, each injection tong being generally vertically disposed and having a downwardly directed tip;
    indexing means mounting each injection tong on the chassis for cyclic reciprocation between an upper extreme wherein the tip is raised clear of the ground surface and a lower extreme wherein the tip has plunged beneath the surface;
    means defining a nozzle adjacent each tip aimed for dispensing treating liquid into the soil when the tip lies beneath the surface;
    means defining a passageway for liquid leading from the frame, through each tong to the nozzle means;
    a valve interposed in said passageway for normally selectively obstructing each conduit;
    a valve actuator connected between the indexing means and the valve for opening the valve only during at least one portion of the cycle wherein the tong tip lies submerged below the surface;
    a reservoir disposed free of the applicator;
    high pressure flexible hose means communicating the reservoir with said passageway carried on the frame;
    pump means communicated with the reservoir and high pressure hose means for supplying treating liquid under pressure in the range of 150–600 p.s.i. to the applicator.

* * * * *